Oct. 27, 1942.　　　　　H. ROSE　　　　　2,300,010
COMBINATION HOT WATER AND STEAM HEATER
Filed Sept. 12, 1938　　　　4 Sheets-Sheet 4
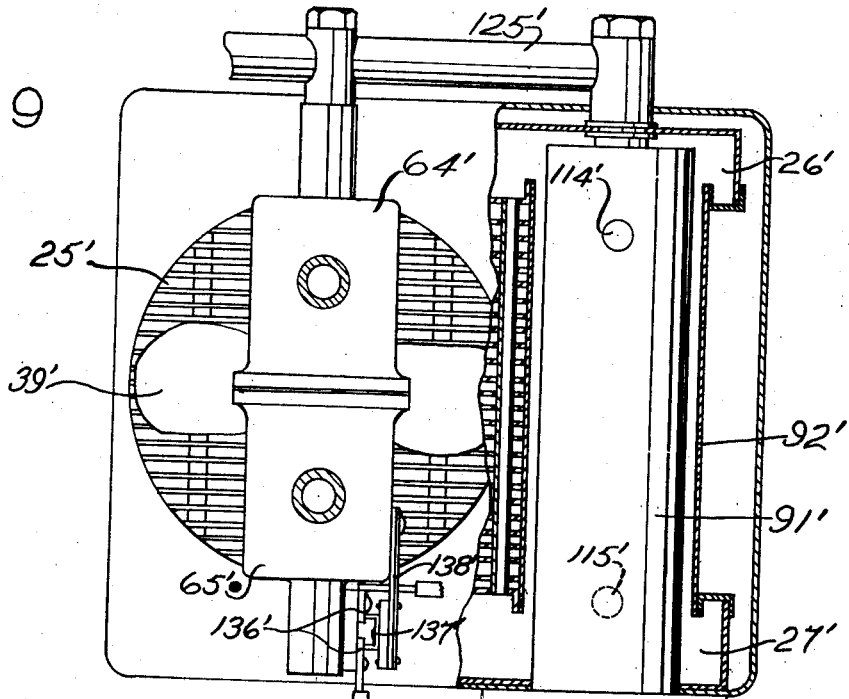
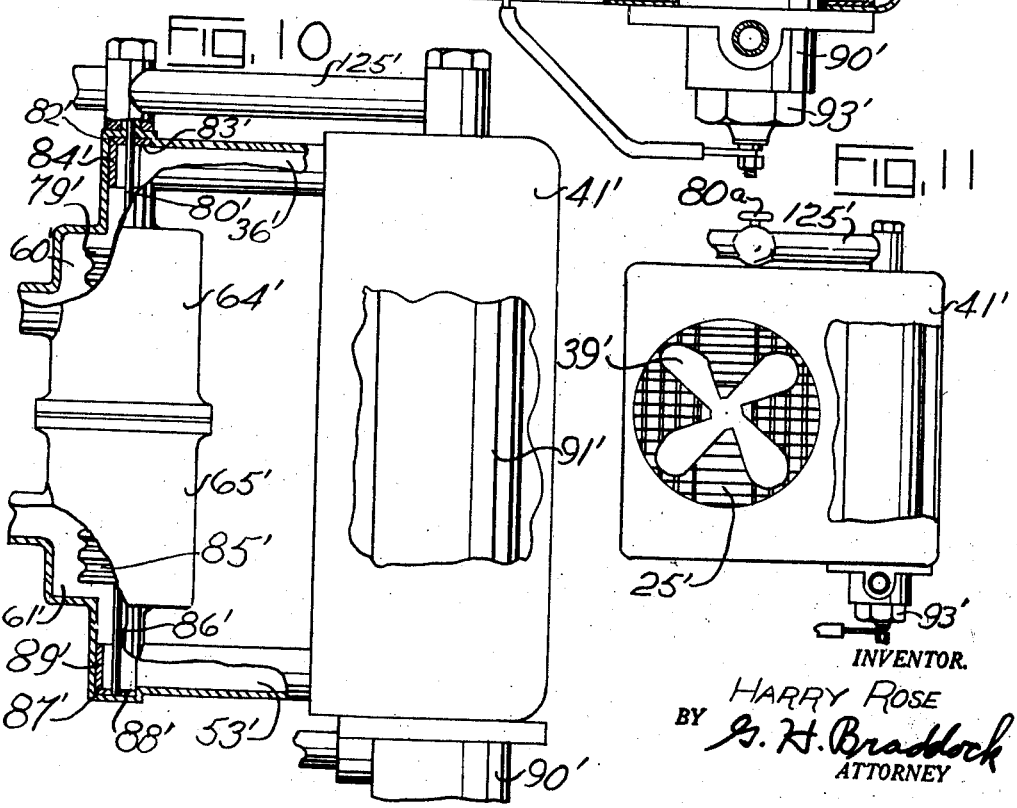
INVENTOR.
HARRY ROSE
BY G. H. Braddock
ATTORNEY Patented Oct. 27, 1942

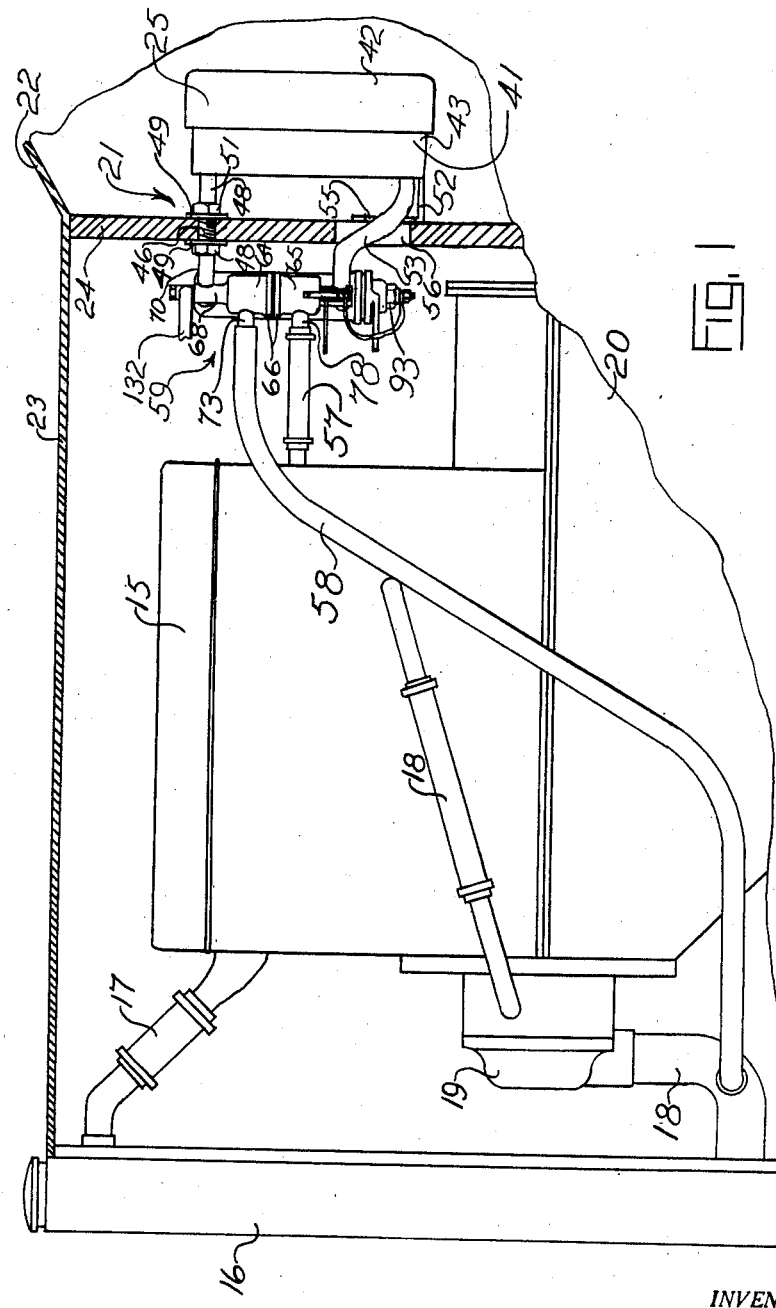

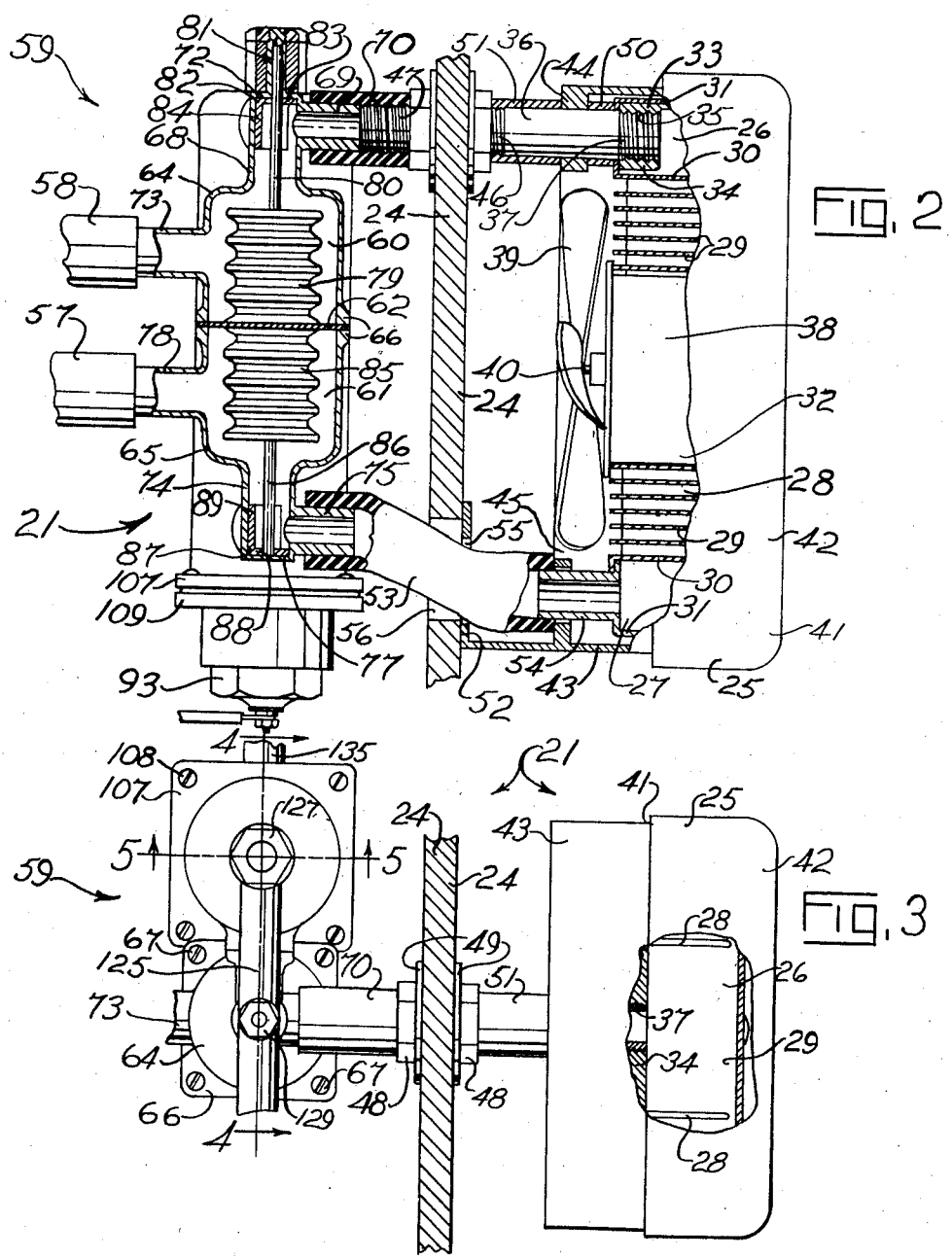

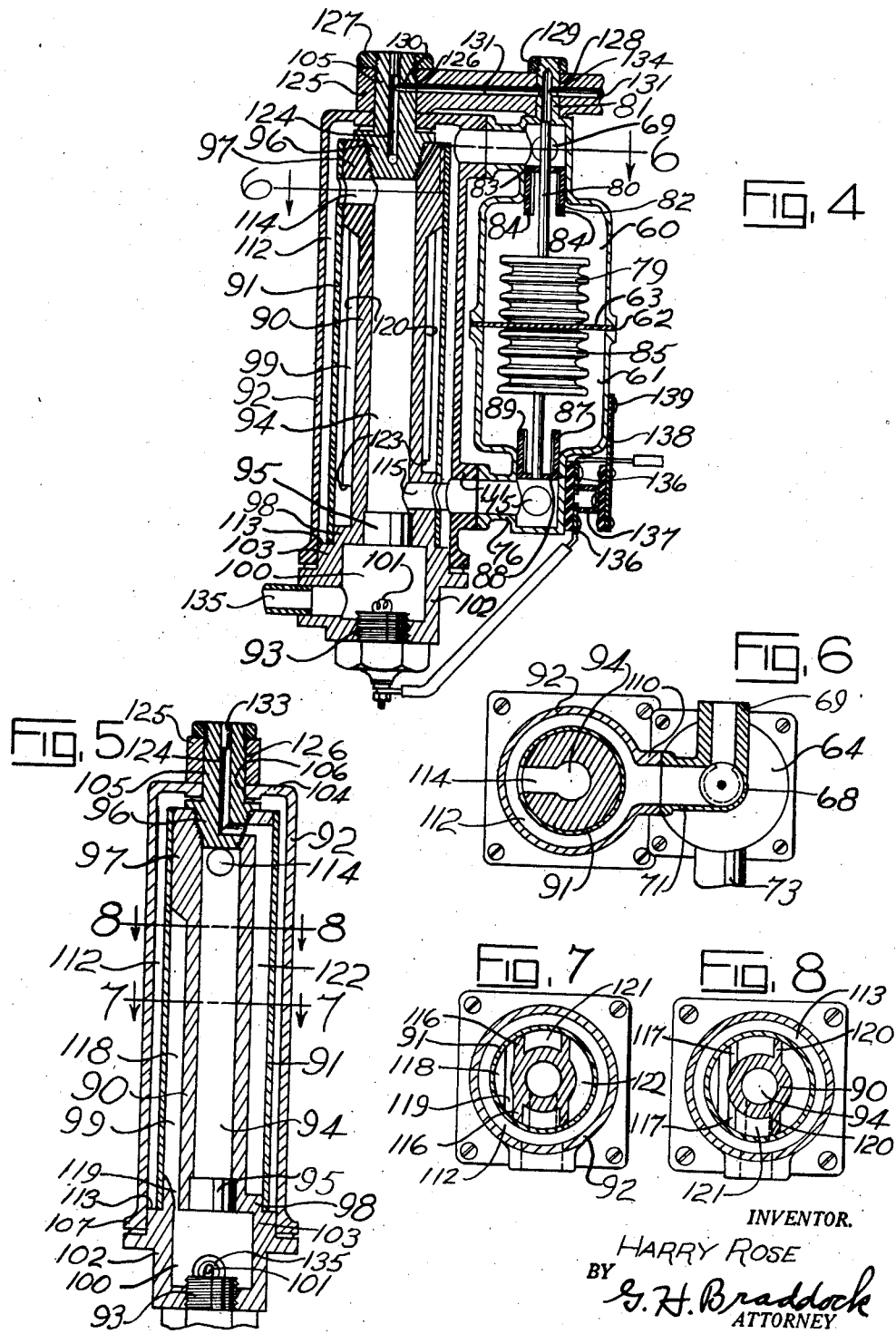

2,300,010

UNITED STATES PATENT OFFICE 2,300,010

COMBINATION HOT WATER AND STEAM
HEATER

Harry Rose, Wyandotte, Mich.

Application September 12, 1938, Serial No. 229,540

2 Claims. (Cl. 237—8)

This invention relates to a combination hot water and steam heater, and has more especial reference to a heating apparatus for warming the interior space of an automotive vehicle body, such, for example, as a pleasure vehicle, taxicab, bus, or truck.

An object of the invention is to provide an automotive vehicle heating apparatus which will include a construction and arrangement for diverting fluid-cooling or circulating medium from the cooling or circulating system of the internal combustion engine of the vehicle and utilizing the diverted fluid-cooling or circulating medium in said heating apparatus as heated fluid medium thereof to the purpose of warming the air of an interior space to be heated of the automotive vehicle under certain conditions of use, and which construction and arrangement will also be capable, under other conditions of use of the heating apparatus and independently of said internal combustion engine cooling or circulating system, of causing heat to be imparted to a portion of said fluid-cooling or circulating medium at or adjacent to said heating apparatus and causing said heated portion of the fluid-cooling or circulating medium to be employed as heated fluid medium of the heating apparatus to the purpose of warming said air of said interior space of the automotive vehicle.

A further object is to provide a heating apparatus of the character as stated, which will include a construction and arrangement for at times employing fluid-cooling or circulating medium from and heated by and circulated by the cooling or circulating system of an internal combustion engine as heated fluid medium utilized in said heating apparatus for heating purposes and for at times utilizing heated fluid medium in said heating apparatus for heating purposes, desirably, but not necessarily, in circuit or communication with the cooling or circulating system of said internal combustion engine, heated and circulated by means other than said cooling or circulating system, as, for example, by the employment of a heater including a fuel burner.

A further object is to provide a combination hot water and steam heating apparatus, more especially useful to the purpose of warming air in the body or an interior space of an automotive vehicle, including mechanism through the instrumentality of which the heating apparatus can at times utilize fluid-cooling or circulating medium from the cooling or circulating system of the internal combustion engine of the automotive vehicle having said body or space to be warmed, after the general manner as now in vogue, to the purpose of providing heated fluid medium for air heating purposes of said heating apparatus, and can at other times utilize a special heater, as, for example, a heater employing a fuel burner, such as a gasoline or other fluid fuel heater, or any convenient fuel heater or burner, to the purpose of providing heated fluid medium for air heating purposes of the heating apparatus, which last mentioned heated fluid medium may be, but need not necessarily be, constituted as a portion of the fluid-cooling or circulating medium of the cooling or circulating system of said internal combustion engine.

A further object is to provide an automotive vehicle heating apparatus as set forth which can be constituted as an ordinary hot water heater as now of commerce, including mechanism for diverting fluid-cooling or circulating medium from the cooling or circulating system of the internal combustion engine of said automotive vehicle and utilizing the diverted fluid-cooling or circulating medium in the heating apparatus as heated fluid medium thereof for warming an interior space of said automotive vehicle, to which has been added mechanism, as, for example, a heater employing a gasoline or other burner as a part thereof, adapted to the purpose of providing, independently of said internal combustion engine cooling or circulating system as such, heated fluid medium for said heating apparatus to be utilized therein to the purpose of warming said interior space to be heated of the automotive vehicle, and in which heating apparatus the two different mechanisms mentioned will be operative at different times, and will not be operative at the same time, to provide or supply heated fluid medium to said heating apparatus.

A further object is to provide an automotive vehicle heating apparatus at set forth which selectively can be employed as a hot water heater of type now of commerce receiving heated fluid medium for heating the heating apparatus from the cooling or circulating system of an internal combustion engine, or as a heated fluid medium or steam heater receiving heated fluid medium or steam from a source other than said internal combustion engine cooling or circulating system as such, as, for example, from a boiler heated by the burning of fuel.

A further object is to provide a heating apparatus of the present character wherein will be incorporated various improved features and characteristics of construction novel both as individual entities of the heating apparatus and in combination with each other.

And a further object is to provide a fuel or fluid fuel or gasoline heated steam or fluid medium heating apparatus, especially useful to the purpose of warming the interior space of an automotive vehicle, which will be of novel and improved construction and can be employed as an independent entity or unit for warming or heating purposes.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a side elevational view of a heating apparatus having the features and characteristics of the invention incorporated therein, disclosing said heating apparatus as when applied to an automotive vehicle;

Fig. 2 is an enlarged vertical sectional view, partially in elevation and partially broken away, of the heating apparatus of Fig. 1;

Fig. 3 is a top plan view, partially in section and partially broken away, of the heating apparatus of Fig. 2;

Fig. 4 is a vertical sectional view, taken on line 4—4 in Fig. 3;

Fig. 5 is a vertical sectional view, taken on line 5—5 in Fig. 3;

Fig. 6 is a horizontal sectional view, taken as on line 6—6 in Fig. 4;

Fig. 7 is a horizontal sectional view, taken as on line 7—7 in Fig. 5;

Fig. 8 is a horizontal sectional view, taken as on line 8—8 in Fig. 5;

Fig. 9 is a rear elevational view, partially in section and partially broken away, of a heating apparatus of modified construction made according to the invention, as said heating apparatus would appear when viewed from the left hand side of Fig. 10;

Fig. 10 is a side elevational view, partially in section and partially broken away, of the heating apparatus of Fig. 9, as said heating apparatus would appear when viewed from the right hand side of said Fig. 9; and Fig. 11 is a rear elevational view, partially broken away, of a heating apparatus of further modified construction including features and characteristics of the invention, the present view being on a scale considerably smaller than that of Figs. 2, 3, 9 and 10.

With respect to the drawings and the numerals of reference thereon, 15 denotes the engine jacket, 16 the fluid-cooling radiator, 17 the fluid connection from the jacket 15 to the radiator, 18 the fluid connection from said radiator to said jacket, and 19 represents, generally, the usual pump for the fluid-cooling medium of an automotive vehicle 20 of any ordinary or preferred character, such as a pleasure vehicle, taxicab, bus or truck. Ordinarily, the fluid-cooling medium is circulated by the pump 19 from the jacket 15 through the connection 17 to the radiator 16, and back to the jacket from the radiator through the connection 18.

In Figs. 1, 2 and 3 of the drawings, the novel and improved heating apparatus, designated 21, is mounted partially within the body 22 of the automotive vehicle 20 and partially beneath the hood 23 of said automotive vehicle, numeral 24 indicating the dash of the vehicle upon which the heating apparatus is supported in a manner to be set forth. As also to be made clear, suitable fluid conveying connections are provided whereby a part or all of the fluid-cooling or circulating medium for the internal combustion engine of said vehicle is diverted and utilized as heated fluid medium for supplying heat to said heating apparatus.

The heating apparatus 21 includes a heating unit 25 situated within the vehicle body 22, and said heating unit 25 includes a fluid-heated, air-heating core consisting of an upper fluid, water or steam tank 26, a lower fluid, water or steam tank 27, a plurality of spaced apart fluid, water or steam tubes, each denoted 28, extending between said tanks 26 and 27, and fins, each indicated 29, in spaced relation upon said tubes 28 and extending transversely thereof. The fluid, water or steam tubes 28 are arranged in two spaced apart tanks or sets of tubes. As disclosed, each tube 28 is relatively flat and wide, said tubes desirably being of width slightly less than that of the tanks 26 and 27. Said tanks desirably are of equal length and width. Outermost tubes 28 of the different banks or sets of tubes will be arranged adjacent the opposite end portions of the tanks and all of said tubes will be parallelly arranged.

Each of the fluid, water or steam tanks 26 and 27 desirably may consist of a header plate 30 into which the adjacent ends of the tubes 28 are suitably fastened in fluid-tight fashion, as by soldering or otherwise, and a housing member 31 suitably fastened, also in fluid-tight fashion, as by soldering or otherwise, to the marginal portions of the corresponding header plate 30.

The fins 29 desirably are of relatively small thickness and of width slightly greater than the width of the tubes, which may be of equal width. The construction will include longer fins adjacent the outer end portions of the core of the heating unit 25 and shorter fins between the two sets of longer fins. The longer fins will be of length about equal to the length of each tank 26, 27, and each shorter fin 29 will be arranged upon the tubes 28 of but a single bank or set of tubes. The forward and rearward edges, respectively, of the fins desirably terminate in a single plane, as do also the outer edges, respectively, of said fins. The inner edges of the shorter fins, between the two sets of longer fins, terminate at about the location of the innermost tubes 28, 28 of the different banks or sets of tubes. The innermost fins of the two sets of longer fins are in spaced relation to each other, and thus a rectangular space, represented 32, in the core and between the banks or sets of tubes and surrounded by the longer and shorter fins is provided, for a purpose to be made clear.

The tubes 28 of the different banks or sets of tubes are desirably spaced at equal distances from each other, and each of said tubes desirably is perpendicular to each header plate 30, with the widths of the tubes preferably disposed perpendicularly to a plane extending longitudinally and perpendicularly through both header plates.

The fins 29, including both the longer and shorter fins, desirably are likewise spaced at equal distances from each other, with the uppermost and lowermost fins being spaced at this same distance from the header plates 30, as best disclosed in Fig. 2. Said fins 29 may be associated with the tubes 28, before said tubes are secured to the header plates 30, by providing openings through the fins of size to fit the tubes and sliding said fins over said tubes, or sliding the tubes through the openings in the fins. Preferably, the fins are secured to the tubes, as by soldering or otherwise, to be in intimate heat conveying contact therewith.

When a core constructed as described is completed, it comprises a generally rectilinear article, said article having the opposite end portions thereof, constituted by the housing members 31 of the tanks 26 and 27, constructed along somewhat curvilinear lines.

A supporting structure for the heating unit 25 is adapted to be assembled with a single tubular or pipe support or connection for said heating unit. The fluid, water or steam tank 26 conveniently carries at the interior thereof a suitable bracket 33, said bracket being suitably secured to the upper wall of the upper housing member 31. A downwardly extending flange 34 of the bracket 33 includes a tapped hole 35 adjacent the rearward wall of said upper housing member. A tubular or pipe support or connection 36 has a thereaded end portion 37 turned into the tapped hole 35, as disclosed very clearly in Fig. 2. The tubular or pipe support or connection 36 extends through an opening in the rearward wall of the upper housing member, and a fluid-tight-seal is provided between said opening and said tubular or pipe support or connection, as by soldering or otherwise. The bracket 33 desirably is constructed so as to spread over a considerable area on the inside of the housing member of the upper tank 26, to provide a relatively wide supporting surface for the heating unit 25. Also, the bracket 33 and the tubular or pipe support or connection 36 are of quite rigid structure, and when said tubular or pipe support or connection is rigidly secured in the rearward wall of the upper housing member 31, as by soldering, said tubular or pipe support or connection is obviously fixed against turning movement in the bracket 33.

Numeral 38 denotes an electric motor within the space 32 of the heating core, said electric motor having a blower or fan 39 fixed upon the motor shaft 40. The electric motor is of dimensions to nicely fit into the space 32, and the arrangement is such that the blower or fan 39 will be situated adjacent the core in fairly close relation thereto, about as illustrated in Fig. 2. When electric power is applied from a source (not shown), such as the battery of an automotive vehicle, to the motor 38, the blower or fan 39 is driven to force air through the core, past and over the tubes and fins thereof. The electric motor may be secured in and to the core of the heating unit 25 in any suitable and convenient manner.

A usual casing 41 is adapted to contain the assembly of the core, motor and blower or fan. Said casing may more or less freely receive said core. As illustrated, the casing is a box-like member consisting of a forward shell 42 and a rearward shell 43, which shells may have a telescoping fit and be secured in fixed relation to each other in any convenient manner. The forward shell 42 will of course include an open front for the heating unit, and said open front may include a grille or air deflector of any suitable construction and design. The shells 42 and 43 together constitute a casing including straight side walls, curvilinear upper and lower end walls, and front wall perpendicular to said side and end walls of the casing, said front wall being cut away or open, as before stated. The cut-away or open portion of the front wall of the core casing may desirably be of area about equal to, or a little less than, and approximately similar to, the overall area covered by the forward surfaces or edges of the fins 29. The back of the casing 41, constituted by the rearward shell 43, includes a flange 44 parallel with the front wall of said casing, said flange 44, together with the adjacent portions of said rearward shell 43, constituting a shroud for the blower or fan 39 and including a circular opening 45 about said blower or fan in spaced relation thereto. The core is inserted in the casing 41 so that said core is situated centrally of the cut-away portion or opening in the front wall of said casing desirably to completely cover said cut-away portion or opening.

The tubular or pipe support or connection 36 constitutes cooperating means through the instrumentality of which the heating unit 25 can be mounted upon a fixed part of the automotive vehicle body. As disclosed very clearly in Figs. 1, 2 and 3, the outer portion 46 of the tubular or pipe support 36 is externally threaded and passes through a hole in the dash 24 of the automotive vehicle, said hole closely fitting upon said tubular or pipe support. An extension 47 of said threaded outer portion 46 of the tubular or pipe support 36 is disposed beneath the hood 23, at the side of the dash 24 opposite the heating unit 25. Said tubular or pipe support is rigidly secured in the dash of the automotive vehicle by adjustable supporting nuts 48 upon the tubular or pipe support, there being one nut 48 at each side of the dash, each of which nuts can be turned up against a washer 49 between the nut and the dash. The tubular or pipe support 36 passes through an opening in the flange 44, and a spacing sleeve 50 upon said tubular or pipe support 36 has one of its ends engaging the rearward surface of the upper housing member 31 of the core and its other end engaging said flange 44. A second spacing sleeve 51 upon the tubular or pipe support 36 has one of its ends engaging the flange 44 and its other end engaging the adjacent supporting nut 48. It will be evident that the supporting nuts 48 can be adjusted to situate the tubular or pipe support 36 in the vehicle dash 24 so that the spacing sleeves 50 and 51 fix the relation of the rearward shell 43, as well as the relation of the casing 41 consisting of the secured together forward and rearward shells 42 and 43, to the dash 24. The arrangement as described makes provision for the rigid securing of the core and its casing, with appurtenances, upon the automotive vehicle body, interiorly thereof. The weight of the casing assembly, including the electric motor and blower or fan, the grille or air deflector and the shroud is made rigid with the core, which carries said weight back to the tubular or pipe support 36.

Numeral 52 denotes a bracket or member integral with a lower portion of the rearward shell 43 and cooperating with the tubular or pipe support 36 to fixedly attach the heating unit to the dash 24. Said bracket or member 52 engages the dash and may be secured thereto in any suitable and convenient manner. A tube or pipe 53 is secured in fluid-tight fashion upon a hollow neck 54 extending rearwardly from the rearward wall of the lower housing member 31. An outer portion of said hollow neck 54 passes through an opening in the flange 44, and said tube or pipe 53 extends through an opening 55 in the bracket or member 52 and through an opening 56 in the dash 24 to position beneath the hood 23, at the side of said dash opposite the heating unit 25.

A hot water heater of commerce constructed as hereinbefore described additionally includes a fluid or water connection extending from the engine jacket 15 to the tube or pipe 53 and a fluid or water connection extending from the tubular or pipe support 36 to the connection 18. However, in the present construction, the fluid connections from said engine jacket 15 to said tube or pipe 53 and from said tubular or pipe support 36 to said connection 18 are by way of a mechanism 59 of structure and for purposes to be described. As shown, a fluid or water pipe 57 constitutes a connection between the engine jacket 15 and the mechanism 59 and said mechanism is connected to the tube or pipe 53 to be capable of communicating therewith at a side of the mechanism opposite said fluid or water pipe 57, and a fluid or water pipe 58 constitutes a connection between said mechanism 59 and the connection 18 and the tubular or pipe support 36 is connected to the mechanism to be capable of communicating therewith at a side of said mechanism opposite said fluid or water pipe 58.

Were the novel and improved mechanism 59 omitted from the heating apparatus, and, instead, the fluid or water pipe 57 directly connected to the tube or pipe 53 in communicating relation therewith and the tubular or pipe support 36 directly connected to the fluid or water pipe 58 in communicating relation therewith, said heating apparatus would be operative in the manner as follows. Assuming the internal combustion engine of the automotive vehicle 20 to be in operation, there would be a substantial flow of heated fluid or water from the jacket 15 through the fluid or water pipe 57 and the tube or pipe 53 to the core of the heating unit 25 and back to said jacket 15 through the tubular or pipe support or connection 36, the fluid or water pipe 58 and the connection 18. Any other suitable and preferred arrangement for circulating all or any desired portion of the heated fluid or water of the engine cooling system through the core of the heating unit 25 can of course be substituted for the arrangement disclosed. As illustrated, the flow of heated fluid or water from and back to the engine jacket is upward through the heating unit core. The flow from and back to the engine jacket could of course be downward through the core of the heating unit, the heated fluid or water in such an event passing through a suitable connection attached to the tubular or pipe support or connection 36 to here enter the core and leaving said core by way of the tube or pipe 53 and a suitable connection attached thereto. The heated fluid or water upon entering the tube or pipe 53 passes into the lower tank 27. Thence heated fluid or water passes upwardly through each of the relatively flat and wide tubes 28 to the upper tank 26. And from said tank 26 the heated fluid or water passes out of the heating unit 25 through the tubular or pipe support or connection 36. While traveling through the tubes 28, the heated fluid or water gives off heat which is absorbed by the fins 29, and, by rotation of the blower or fan 39 to force air past and over the tubes and fins, the air is caused to be heated and distributed throughout the vehicle body.

The mechanism 59 by way of which the engine jacket 15 and the fluid or water pipe 57 are connected to the tube or pipe 53 and the tubular or pipe support 36 is connected to the fluid or water pipe 58 itself attached to the connection 18 is disclosed in Figs. 1, 2 and 3 as situated beneath the hood 23, supported by the externally threaded extension 47 of the tubular or pipe support 36, and associated with the tube or pipe 53. A purpose of said mechanism 59 is to provide or supply heated fluid medium or steam for the heating unit 25 and to cause the provided or supplied heated fluid medium or steam to be forced or fed to said heating unit independently of the cooling or circulating system as such of the internal combustion engine of the automotive vehicle 20, and a further purpose of the mechanism 59 is to render said internal combustion engine cooling or circulating system as such incapable of forcing or feeding heated fluid medium to the heating unit 25 while said mechanism is causing heated fluid medium or steam to be forced or fed to said heating unit, as well as to render the mechanism 59 itself incapable of causing heated fluid medium or steam to be forced to the heating unit 25 while this is being supplied or provided with heated fluid medium from the cooling or circulating system of the internal combustion engine of said automotive vehicle 20.

The mechanism 59 includes a pair of control chambers constituted as an upper control chamber 60 and a lower control chamber 61. A horizontal partition 62 between the control chambers 60 and 61 separates said control chambers from each other, and a small opening 63 through said partition 62 affords limited communication between the control chambers 60 and 61 to a purpose to be made clear. The control chambers 60 and 61 are provided by an upper and a lower bellows housing, denoted 64 and 65, respectively, and each of said bellows housings 64 and 65 includes a horizontal flange 66 at the end thereof adjacent the horizontal partition 62. Said partition is clamped in fluid-tight fashion between said horizontal flanges 66, as by screw bolts 67, and said screw bolts rigidly secure the bellows housings 64 and 65 to each other.

The upper bellows housing 64 includes an upwardly extending, desirably cylindrical, hollow neck 68 at the upper portion thereof, which neck 68 is adapted to communicated at an upper portion thereof with an integral, hollow, horizontal boss or protuberance 69 alined with the externally threaded extension 47 of the tubular or pipe support 36 and rigidly secured to the extension 47 in communicating relation therewith by a tubular element 70 in surrounding relation to both said boss or protuberance 69 and said extension 47. That is, the tubular element 70 rigidly secures the upper bellows housing 64 to the extension 47 and thus mounts the mechanism 59 upon the tubular or pipe support 36, and said tubular element 70 is of construction and is composed of material to constitute a fluid seal between said extension 47 and said boss or protuberance 69. Said neck 68 is also joined with a second integral, hollow, horizontal boss or protuberance 71 at the elevation of the boss or protuberance 69 and disposed substantially ninety degrees from said boss or protuberance 69 in the disclosure as made. The bosses or protuberances 69 and 71 are adapted to communicate with each other by way of an upper portion of said hollow neck 68. The upper end of the hollow neck 68, directly above the bosses or protuberances 69 and 71, is closed by a horizontal piece 72. Stated differently, the hollow neck 68 is open at its lower portion to the upper control chamber 60 and includes the hollow bosses or protuberances 69 and 71 at its upper portion, but otherwise said hollow neck 68 is closed. The fluid or water pipe 58 is connected to a hollow boss or protuberance 73 upon and integral with the upper bellows housing 64, below the neck 68, in communicating relation to the upper control chamber 60.

The lower bellows housing 65 includes a downwardly extending, desirably cylindrical, hollow neck 74 at the lower portion thereof, which neck 74 is adapted to communicate at a lower portion thereof with an integral, hollow, horizontal boss or protuberance 75 alined with the tube or pipe 53. As disclosed, the boss or protuberance 75 is fitted in fluid-tight fashion into the adjacent end of said tube or pipe 53. The construction and arrangement is such that said boss or protuberance 75 and the tube or pipe 53 cooperate with the tubular or pipe support 36 and the boss or protuberance 69 to cause the mechanism 59 to be stably mounted upon said tubular or pipe support 36, itself supported upon the dash 24. Said neck 74 is also joined with a second integral, hollow, horizontal boss or protuberance 76 at the elevation of the boss or protuberance 75 and disposed substantially ninety degrees from said boss or protuberance 75 in the disclosure as made. The bosses or protuberances 75 and 76 are adapted to communicate with each other by way of a lower portion of said hollow neck 74. The lower end of the hollow neck 74, directly below the bosses or protuberances 75 and 76, is closed by a horizontal piece 77. Stated differently, the hollow neck 74 is open at its upper portion to the lower control chamber 61 and includes the hollow bosses or protuberances 75 and 76 at its lower portion, but otherwise said hollow neck 74 is closed. The fluid or water pipe 57 is connected to a hollow boss or protuberance 78 upon and integral with the lower bellows housing 65, above the neck 74, in communicating relation to the lower control chamber 61.

The partition 62 fixedly supports the lower portion of an upper control bellows 79 which is situated in the upper control chamber 60 in spaced relation to the upper bellows housing 64 and extends upwardly from said partition 62. The upper end of the upper control bellows 79 is closed and fixedly supports an upper valve stem and control plunger 80 which extends upwardly through the hollow neck 68 in spaced relation thereto. An upper portion of the upper valve stem and control plunger 80 extends through said horizontal piece 72, as well as through an upstanding stud 81 integral with the horizontal piece 72, and is slidably guided in said horizontal piece and said upstanding stud. The arrangement is such that the horizontal piece 72 and the upstanding stud 81 are fitted about the valve stem and control plunger 80 in fluid-tight manner. An intermediate portion of the upper valve stem and control plunger 80 fixedly carries a generally L-shape valve 82 including a desirably circular, horizontal portion 83 thereof adapted to shut-off communication through the hollow neck 68 between the boss or protuberance 69 and the control chamber 60 when the upper control bellows is contracted, as in Fig. 4, and also including a vertical portion 84 thereof adapted to shut off communication by way of the upper portion of said neck 68 between the boss or protuberance 71 and said boss or protuberance 69 when said upper bellows 79 is expanded, as in Fig. 2. As shown the horizontal portion 83 of the L-shape valve 82 engages the horizontal piece 72 when the upper control bellows 79 is expanded to position so that the vertical portion 84 of said L-shape valve 82 is in shutting-off relation to the boss or protuberance 71, and said horizontal piece 72 constitutes a stop which limits upward movement of the L-shape valve 82 and expanding action of the upper control bellows 79. The circular, horizontal portion 83 of said L-shape valve 82 is situated in the hollow, cylindrical neck 68, between the bosses or protuberances 69, 71 and the upper control chamber 60, when the upper control bellows 79 is contracted, to completely shut off communication between said boss or protuberance 69 and the fluid or water pipe 58. Said upper control bellows 79 of course expands upon being heated and contracts upon being cooled.

The partition 62 also fixedly supports the upper portion of a lower control bellows 85 which is situated in the lower control chamber 61 in spaced relation to the lower bellows housing 65 and extends downwardly from said partition 62. The lower end of the lower control bellows 85 is closed and fixedly supports a lower valve stem 86 which extends downwardly through the hollow neck 74 in spaced relation thereto. The lower end of the lower valve stem 86 fixedly carries a generally L-shaped valve 87 including a desirably circular, horizontal portion 88 thereof adapted to shut off communication through the neck 74 between the control chamber 61 and the boss or protuberance 75 when the lower control bellows 85 is contracted, as in Fig. 4, and also including a vertical portion 89 thereof adapted to shut off communication by way of the lower portion of said neck 74 between said boss or protuberance 75 and the boss or protuberance 76 when said lower control bellows 85 is expanded, as in Fig. 2. As shown, the horizontal portion 88 of the L-shape valve 87 engages the horizontal piece 77 when the lower control valve 85 is expanded to position so that the vertical portion 89 of said L-shape valve 87 is in shutting-off relation to the boss or protuberance 76, and said horizontal piece 77 constitutes a stop which limits downward movement of the L-shape valve 87 and expanding action of the lower control bellows 85. The circular, horizontal portion 88 of said L-shape control valve 87 is situated in the hollow, cylindrical neck 74, between the lower control chamber 61 and the bosses or protuberances 75, 76, when the lower control bellows 85 is contracted, to completely shut off communication between the fluid or water pipe 57 and the boss or protuberance 75. Said lower control bellows 85 of course expands upon being heated and contracts upon being cooled.

It will be obvious that when the control bellows 79 and 85 are situated as in Fig. 2, there will be a communicating connection by way of the lower bellows housing 65 between the fluid or water pipe 57 and the tube or pipe 53, as well as a communicating connection by way of the upper bellows housing 64 between the tubular or pipe support 36 and the fluid or water pipe 58. It will also be obvious that when the control bellows 79 and 85 are situated as in Fig. 4, there will be a communicating connection by way of the upper portion of the hollow neck 68 between the boss or protuberance 71 and the boss or protuberance 69 leading to the tubular or pipe support or connection 36, as well as a communicating connection by way of the lower portion of the hollow neck 74 between the boss or protuberance 75 leading from the tube or pipe 53 and the boss or protuberance 76.

The heating apparatus incorporates a fuel or fluid fuel heating device which in the disclosure as made is associated or assembled with the bosses or protuberances 71 and 76 upon the upper and lower hollow necks 68 and 74, respectively. Said heating device includes a boiler consisting of an inner boiler casting 90, an intermediate boiler sleeve 91 and an outer boiler shell 92, and also includes a burner 93 for causing the boiler to be heated.

The inner boiler casting 90 as shown provides an inner fluid or water chamber 94 of the boiler. The lower end of the inner chamber 94 is closed by an expansion plug 95 and the upper end of said inner chamber is closed by a screw plug 96.

The intermediate boiler sleeve 91 has its opposite end portions tightly fitted upon enlarged end portions, indicated 97 and 98, respectively, of the inner boiler casting 90, and the outer surface of said boiler casting is cut away, as indicated at 99, at location between the end portions of the boiler casting to provide flues for hot gases leading from a combustion chamber 100 of the burner 93. As disclosed, said burner 93 is constituted as a screw plug member threaded in a lower wall of the boiler casting 90 and including a resistance element 101 situated in the combustion chamber 100, and said combustion chamber is situated directly beneath the expansion plug 95 and above the burner 93 and is provided by an integral lower portion 102 of the boiler casting 90.

The outer boiler shell 92 is situated in spaced, surrounding relation to the boiler sleeve 91. The lower end portion of said boiler shell 92 is tightly fitted upon an enlarged portion 103 of the boiler casting 90 at the outer side of and below the elevation of the enlarged end portion 98. The upper end of the boiler shell 92 includes a horizontal closure wall 104. The screw plug 96 has an integral upwardly extending stud 105 thereon, and the horizontal closure wall 104 includes an opening 106 in which said stud 105 is situated in fluid-tight fashion. An upper portion of the stud 105 is disposed above said closure wall 104. The horizontal closure wall 104 is in spaced relation to the upper ends of the boiler casting 90 and the boiler sleeve 91. As disclosed, the upper ends of said casting 90 and said sleeve 91 terminate in a single horizontal plane. Evidently, the boiler construction as illustrated and as thus far described includes elements, the casting 90, the sleeve 91 and the shell 92, which are rigidly secured together. That is to say, the boiler shell 92 is rigidly secured upon the boiler casting 90 and the upwardly extending stud 105, itself rigidly secured to said boiler casting, and the boiler sleeve 91 is tightly fitted upon the boiler casting. The lower end of the boiler shell 92 includes a horizontal flange 107 which is secured, as by screw bolts 108, to a complemental flange 109 upon the boiler casting 90.

An upper portion of the boiler shell 92 communicates with a hollow, horizontal boss or protuberance 110 which is integral with said boiler shell and is situated just below the horizontal closure wall 104, in alining relation with the boss or protuberance 71. As disclosed, said bosses or protuberances 71 and 110 are rigidly secured together in communicating, fluid-tight relation to each other. Any suitable and convenient means can be employed to this purpose. A lower portion of the boiler shell 92 communicates with a hollow, horizontal boss or protuberance 111 which is integral with said boiler shell and is situated slightly above the enlarged portion 103 of the boiler casting 90, in alining relation with the boss or protuberance 76. Said bosses or protuberances 76 and 111 are also rigidly secured together in communicating, fluid-tight relation to each other by employment of any suitable and convenient means. Thus, the boiler, with appurtenances, is fixedly supported upon the bellows housings 64 and 65, which are, in turn, rigidly secured to each other, rigidly mounted upon the tubular or pipe support 36, and stably assembled with the tube or pipe 53.

The boiler shell 92 and the boiler sleeve 91 together provide an annular water chamber 112 between said shell and sleeve and in surrounding relation to said sleeve. The base or bottom 113 of the annular water chamber 112 is constituted by material of a lower portion of the boiler casting 90, as will be clear from Figs. 4, 5, 7 and 8. A port 114 leads through the boiler casting 90 and the boiler sleeve 91 from the upper end of the inner water chamber 94 to an upper portion of the annular fluid or water chamber 112. As shown, the port 114 passes through upper portions of the casting 90 and the sleeve 91 which are tightly fitted to each other, and is situated at elevation slightly below the elevation of the boss or protuberance 110, substantially at a right angle from said mentioned boss or protuberance. A port 115 leads through the boiler sleeve 91 and the boiler casting 90 from a lower portion of the annular fluid or water chamber 112 to the lower end of the inner fluid or water chamber 94. The port 115 passes through lower portions of the sleeve 91 and the casting 90 which are tightly fitted to each other, and is situated at the elevation of the boss or protuberance 111, in alinement with said mentioned boss or protuberance.

The flues for hot gases from the combustion chamber 100 which the cut-away portions 99 supply are constructed to provide three passes for the hot gases before they are removed from intimate contact with the boiler. Stated differently, the hot gases which pass through the flues travel first upwardly, then downwardly, and finally upwardly. To this end, the external surface of the boiler casting 90 includes a set of oppositely disposed, alining ribs 116, 116 which extend longitudinally of the boiler casting from the position of the lower enlarged portion 98 to position slightly below the upper enlarged portion 97. That is, the lower ends of the oppositely disposed, alining ribs 116, 116 meet the lower enlarged portion 98, and the upper ends 117 of said ribs extend to position above the section line 7—7 in Fig. 5 and terminate at elevation just below the section line 8—8 in said Fig. 5, as will be clear from Figs. 7 and 8. The outer or side edges of said ribs 116, 116 meet the inner wall of the boiler sleeve 91 to thus provide a passageway 118 for hot gases leading upwardly from the combustion chamber 100. As will be seen in Fig. 5, said combustion chamber 100 is in communication with the upwardly leading passageway 118 through a port of passageway 119. The external surface of the boiler casting 90 includes a set of oppositely disposed, alining ribs 120, 120 which extend longitudinally of the boiler casting from position slightly above said enlarged portion 98 and meet the upper enlarged portion 97. The ribs 120, 120 are in spaced, parallel relation to the ribs 116, 116, and the outer or side edges of said ribs 120, 120 meet the inner wall of said boiler sleeve 91 to thus provide, together with the ribs 116, 116, spaced apart passageways 121, 121 for hot gases leading downwardly between adjacent ribs 116, 120 and 116, 120, and a passageway 122 leading upwardly from the lower ends 123 of the ribs 120, 120 and the passageways 121, 121. The ribs 116, 116 completely separate the upwardly leading passageway 118 from the downwardly leading passageways 121, 121 save at the upper ends 117 of said ribs 116, and the ribs 120, 120 completely separate said downwardly leading passageways 121, 121 from the upwardly leading passageway 122 save at the lower ends 123 of said ribs 120. An upper portion of the upwardly leading passageway 122 traverses the enlarged part 97 of the boiler casting 90, and the upper end of said upwardly leading passageway 122 terminates in an outlet 124 for conveying the hot gases from the burner and boiler, which outlet 124 leads upwardly through the screw plug 96 and its stud 105. Stated differently, the course for hot gases from the combustion chamber 100 and intended to traverse the boiler is upwardly through the port or passageway 119 and the passageway 118, thence past the upper ends 117, 117 of the ribs 116, 116 and downwardly through the passageways 121, 121, and thence past the lower ends 123, 123 of the ribs 120, 120 and upwardly through the passageway 122 and the outlet 124. In thus passing through the boiler, at location between the inner fluid or water chamber 94 and the outer, fluid or water chamber 112, the hot gases will impart substantially all of their heat to fluid or water in said chambers of the boiler.

A fixture plate 125 is disclosed fastened down against the horizontal piece 72 and the horizontal closure wall 104. As illustrated, the piece 72 and the closure wall 104 are in a single horizontal plane and the fixture plate 125 is horizontally situated. More explicitly, said fixture plate 125 includes an opening 126 which snugly receives the upwardly extending stud 105 upon the screw plug 96 and a nut 127 upon the upper end of said stud 105 fastens the fixture plate down against said closure wall 104, and said fixture plate also includes an opening 128 which snugly receives the upstanding stud 81 upon the horizontal piece 72 and a nut 129 upon the upper end of said stud 81 fastens the fixture plate down against said horizontal piece 72. The arrangement as illustrated and described renders all of the fixture plate 125, the stud 105 and the stud 81 rigid with each other and assists in causing the mechanism 59 to be constituted as a unitary, rigid structure.

The outlet 124 for hot gases communicates by way of a horizontal port 130 in the upwardly extending stud 105 with an exhaust passageway 131 extending longitudinally through the fixture plate 125, and said exhaust passageway 131 is adapted to have communicating connection through a tube or pipe 132, disclosed in Fig. 1, with the intake manifold of the internal combustion engine of the automotive vehicle 20. The upper end of the outlet 124 is sealed by a plug 133.

A part 134 of the exhaust passageway 131 extends diametrically through the upstanding stud 81 upon the horizontal piece 72 across the path of the upper valve stem and control plunger 80. When the upper control bellows 79 is expanded, said upper valve stem and control plunger 80 is across the part 134 of the exhaust passageway 131, as in Fig. 2, to completely shut off communication between the outlet 124 and the intake manifold, and when said upper control bellows is contracted, the upper valve stem and control plunger is below and spaced from said part 134 of said exhaust passageway 131, as in Fig. 4, so that there is communicating connection between said outlet 124 and said intake manifold.

An inlet pipe 135 leading into the combustion chamber 100 is adapted to extend from a carburetor (not shown) for causing fluid fuel, such as gasoline mixed with air, to be drawn or fed into said combustion chamber in response to suction created in the intake manifold when the control plunger 80 is situated away from or out of the part 134 of the exhaust passageway 131.

The resistance element 101 is adapted to be energized by electrical current from any suitable and convenient source (not shown). A circuit for said resistance element can include spaced apart, fixed conducting elements 136, 136 insulatively supported upon the lower bellows housing 65 and adapted to be bridged by a movable conducting element 137 insulatively mounted upon a bi-metallic blade 138 having its upper end portion secured, as at 139, upon said lower bellows housing 65. The arrangement is such that the conducting element 137 is caused to move outwardly to break connection between the spaced apart, fixed conducting elements 136, 136 when the temperature of said bi-metallic blade 138 is increased, and is caused to move inwardly to make connection between said fixed contact elements 136, 136 when the temperature of said bi-metallic blade is decreased. When the switch including the conducting elements 136, 137, 136 is closed the resistance element 101 is energized, and when said switch is open said resistance element is de-energized. In Fig. 4, the switch 136, 137, 136 is closed. When the parts of the heating apparatus are situated as in Fig. 2, said switch will be open.

Assuming the parts of the heating apparatus to be situated as in Fig. 4, with the resistance element 101 energized and the internal combustion engine of the automotive vehicle in operation, liquid fuel, say, for example, gasoline mixed with air, will be drawn or pulled or fed from the carburetor employed into the combustion chamber 100 through the inlet pipe 135, due to suction created in the intake manifold of said internal combustion engine. The combustible fuel mixture of course will be ignited by said resistance element 101 and caused to burn in said combustion chamber 100. The products of combustion, or hot gases, will pass through the flues of the heating device and traverse the boiler along the flue passageways or channels hereinbefore described, and will cause fluid or water in both the inner chamber 94 and the outer, annular chamber 112 of the boiler to be transformed into steam or hot vapor. Eventually, the products of combustion, when spent and comparatively cool, will pass to the intake manifold of the internal combustion engine. Evidently, steam or hot vapor created in the fluid or water chambers of the boiler will rise to the top or upper portion of said boiler and traverse the hollow bosses or protuberances 110, 71, the upper portion of the hollow neck 68, the hollow boss or protuberance 69 and the tubular or pipe support 36 over to the heating unit 25. The steam or hot vapors will enter the upper tank 26 of the core of said heating unit and will, naturally, be forced downwardly into the tubes 28. Here the steam or hot vapors will give up heat to said heating unit and its tubes 28 and fins 29 in the general manner as hereinbefore set forth in connection with fluid-cooling or circulating medium from the internal combustion engine of the automotive vehicle 29. And, in addition to giving up heat to the core of the heating unit, said steam or hot vapors will be condensed in said core and its tubes by the action of the blower or fan 39, as will be apparent. The condensed fluid or water, while still imparting heat to the heating unit and its tubes and fins, will pass downwardly by gravity to the lower tank 27 of the core of said heating unit, and thence the condensed fluid or water will travel by way of the hollow neck 54, the tube or pipe 53, the hollow boss or protuberance 75, the lower portion of the hollow neck 74 and the hollow bosses or protuberances 76 and 111 back into the fluid or water chambers 94 and 112. As hereinbefore set forth, said chambers 94 and 112 are intercommunicating, by way of the lower port 115, as well as by way of the upper port 114. The system which the fluid fuel or gasoline heating device as illustrated and described employs is commonly known as a thermo-syphon system.

When the fluid-cooling or circulating medium of the cooling or circulating system of the internal combustion engine of the automotive vehicle 20 is below a set and predetermined temperature at or above which said fluid-cooling or circulating medium should be to properly heat the interior space of the body 22 of the automotive vehicle, the control bellows 79 and 85 will be contracted, the switch 136, 137, 136 will be closed, and the upper valve stem and control plunger will be below and out of the part 134 of the exhaust passageway 131, as in Fig. 4. Supposing the internal combustion engine of the automotive vehicle 20 to be started up cold with the parts of the heating apparatus positioned as in said Fig. 4, the course of the fluid-cooling or circulating medium of the cooling or circulating system of the internal combustion engine from the jacket 15 to the heating apparatus and back to the jacket will be through the fluid or water pipe 57 to the lower control chamber 61, thence through the opening 63 in the partition 62 to the upper control chamber 60, and thence through the fluid or water pipe 58 and the connection 18 back to the jacket 15. The fluid-cooling or circulating medium cannot at this time pass downwardly through the hollow neck 74 or upwardly through the hollow neck 68 because said hollow necks are completely shut off or closed by the valves 87 and 82, respectively, as clearly illustrated in Fig. 4. Naturally, the fluid-cooling or circulating medium from the cooling or circulating system of the internal combustion engine which passes through the control chambers 61 and 60 will, upon the heating up of said fluid-cooling or circulating medium due to heating up of the internal combustion engine by operation thereof, cause the upper control bellows 79 and the lower control bellows 85 to become heated, and also cause the upper and lower bellows housings 64 and 65 to become heated. In turn, said bellows housings 64 and 65 will impart heat to the bi-metallic blade 138. However, said control bellows 79 and 85 will remain in contracted conditions which situate the valves 82 and 87 in the closed conditions of the hollow necks 68 and 74, and the bi-metallic blade 138 will remain in the closed condition of the switch 136, 137, 136 and the control plunger 80 in the open condition of the exhaust passageway 131 until the temperature of the fluid-cooling or circulating medium of the cooling or circulating system of the internal combustion engine has become heated up to a degree at which it is desirable that fluid or water of said cooling or circulating system traverse the heating unit 25. At such time as this happens, the upper and lower control bellows 79 and 85 will have expanded sufficiently to allow communicating connection between the lower control chamber 61 and the tube or pipe 53 and between the tubular or pipe support 36 and the upper control chamber 60, and to shut off communicating connection between the bosses or protuberances 71 and 69 and between the bosses or protuberances 75 and 76. Also at this time, the bi-metallic blade 138 will have become warped or flexed to open the switch 136, 137, 136. And additionally at this time, the upper valve stem and control plunger 80 will have entered the part 134 of the exhaust passageway 131 and caused said exhaust passageway to become shut off.

During the interval the internal combustion engine is warming up, the heating device operates in the manner and to the purpose as hereinbefore fully set forth, and when the temperature of the fluid-cooling or circulating medium of the internal combustion engine cooling or circulating system becomes sufficiently warm or hot to properly heat the interior of the automotive vehicle body 22, operation of said heating device is concluded. That is, the outlet or exhaust passageway 131 is shut off and the resistance element 101 is deenergized, both to terminate the drawing or pulling or feeding of combustible fuel mixture into the combustion chamber 100 and to preclude ignition and burning of combustible fuel mixture in said combustion chamber.

While the control bellows 79 and 85 are expanded and hot fluid or water is being caused to circulate from the jacket 15 to the heating unit 25 and back to said jacket 15, the course of the flow of hot fluid or water through the mechanism 59 is from the fluid or water pipe 57 into the lower control chamber 61 and thence through the tube or pipe 53 into the lower tank 27 of the core of the heating unit, and from the upper tank 26 of said core into the tubular or pipe support or connection 36 and thence through the upper control chamber 60 and the fluid or water pipe 58 and the connection 18 back to said jacket 15. The opening 63 through the partition 62 is of negligible size and does not appreciably lessen the flow of hot fluid or water through the heating unit 25 when this is being supplied or provided with fluid-cooling or circulating medium from the internal combustion engine cooling or circulating system.

Attention is called to the fact that in the disclosure as made, steam or hot vapor supplied or provided by the special heating device of the heating apparatus is caused to flow or travel downwardly through the heating unit 25, while hot fluid or water supplied or provided by the cooling or circulating system of the internal combustion engine of the automotive vehicle 20 is caused to flow or travel upwardly through said heating unit. As hereinbefore mentioned, the flow or travel last mentioned also could be downwardly through the heating unit 25.

Attention also is called to the fact that should the fluid-cooling or circulating medium of the cooling or circulating system of the internal combustion engine of the automotive vehicle 20 become reduced in temperature to extent sufficiently to render said medium unfit for proper heating of the interior space of the body 22 of said automotive vehicle during operation of the internal combustion engine, the parts of the heating apparatus will become operated from the positions as in Fig. 2 to the positions as in Fig. 4, so that steam or hot vapor heating medium will be supplied or provided for and fed to the heating unit 25 by the special heating device.

In the embodiments of the invention illustrated in the drawings, one of which embodiments hereinbefore has been described, energization and deenergization of the resistance element 101 is accomplished by employment of a bi-metallic blade which receives its heat from the hot fluid or water of the internal combustion engine cooling or circulating system and causes a switch, such as the switch 136, 137, 136, controlling a circuit for said resistance element 101 to be opened and closed. Obviously, the switch employed for controlling the circuit for the resistance element could be opened and closed in some other suitable and convenient manner, as by utilization of a control bellows 79 or 85 and the movement thereof to this purpose.

In practical operation of the heating apparatus, let it be supposed a person intending to operate the automotive vehicle 20 starts up the engine thereof in winter and when cold, and also closes a switch (not shown) of said heating apparatus which causes the electric motor 38 to be energized and the blower or fan 39 to be put in operation. In just a few seconds real heat is produced in the automotive vehicle body through the instrumentality of steam or hot vapor supplied, provided or fed to the heating unit 25 by the special heating device. A very short while afterwards, say when the automotive vehicle has been driven only a short distance, the fluid-cooling or circulating medium of the cooling or circulating system of the internal combustion engine becomes sufficiently heated to supply or provide heating medium hot enough to the purpose of properly warming the interior space of said automotive vehicle body, and control of the heating medium for the heating unit 25 is turned over to said internal combustion engine cooling or circulating system and taken away from the special heating device. Later, should the temperature of the fluid-cooling or circulating medium of the cooling or circulating system of the internal combustion engine drop to temperature at which it is unfit to the purpose of properly warming the interior space of the automotive vehicle body, control of the heating medium for said heating unit 25 is turned back to the special heating device and taken away from the internal combustion engine cooling or circulating system.

Evidently, the special heating device which the invention presents can be inexpensively maintained, especially for the reasons that it is required to function for only a short period any time it is placed in operation and that it is but infrequently required to be operated. At the same time, said special heating device renders the heating apparatus altogether efficient, satisfactory and dependable, particularly because of the fact that it is capable of producing quick heat and real heat at the heating unit 25.

In Figs. 9 and 10 there is disclosed a heating apparatus of modified construction made according to the invention. This modified heating apparatus includes a heating unit 25', an electric motor for driving a blower or fan 39', a casing 41', an upper control chamber 60', a lower control chamber 61', an upper bellows housing 64', a lower bellows housing 65', an upper control bellows 79', an upper valve stem and control plunger 80', an L-shape valve 82' with horizontal portion 83' and vertical portion 84', a boiler with inner boiler casting 90', intermediate boiler sleeve 91' and outer boiler shell 92', a burner 93', a fixture plate 125' with exhaust passageway similar to the exhaust passageway 131, spaced apart, fixed conducting elements 136', 136', a movable conducting element 137', and a bi-metallic blade 138', all constructed and adapted to function in the general manner as do the more or less similar parts hereinbefore described.

The boiler of Figs. 9 and 10 is built directly into the heating unit 25', at a side of the motor and blower or fan, the upper tank 26' of the core of said heating unit being open to upper portions of the fluid or water chambers of said boiler and lower portions of said fluid or water chambers of the boiler being open to the lower tank 27' of said core. The ports 114' and 115' are equivalent to the ports 114 and 115 hereinbefore described. The heating device of the structure of Figs. 9 and 10 will include flues which traverse the boiler in the general manner as before described and are adapted to deliver products of combustion, or hot gases, to the exhaust passage leading through the fixture plate 125' adapted to have communicating connection with the intake manifold of an internal combustion engine, such as that of the automotive vehicle 20.

The upper control chamber 60' is connected with the upper tank 26' of the heating unit 25' by a tube or pipe 36' and the lower tank 27' of said heating unit is connected with the lower control chamber 61' by a tube or pipe 53'. The horizontal portion 83' of the valve 82' will control passage of hot fluid or water from the tube or pipe 36' into the upper control chamber 60', and the horizontal portion 88' of the valve 87' will control passage of hot fluid or water from the lower control chamber 61' into the tube or pipe 53'.

The present construction will operate in about the way as already described, except that the control bellows 79' and 85' will function to control only the travel or passage of hot fluid or water from the lower control chamber 61' to the tube or pipe 53' and the travel or passage of hot fluid or water from the tube or pipe 36' to the upper control chamber 60', and to cause the exhaust passageway through the fixture plate 125' to be open when the upper control bellows 79' is contracted and to be shut off when said upper control bellows is expanded, in about the manner as hereinbefore set forth. There of course will be a partition, such as 62, with opening, such as 63, between the upper and lower control chambers 60' and 61'. The feed of steam or hot vapor from the boiler into the upper tank 26' will take place while the burner 93' is operative to supply heat, and no steam or hot vapor will be fed into said upper tank 26' from said boiler when the burner is out of operation and not at sufficient temperature to supply steam or hot vapor. Said burner 93' will become ignited and extinguished substantially in the manner as recited in connection with the burner 93 and substantially in the same timed relation to contracting and expanding action of the control bellows 79' and 85' as does said burner 93 become ignited and extinguished in timed relation to the contracting and expanding action of the control bellows 79 and 85. Steam or hot vapor upon entering the upper tank 26' will be forced down through the tubes of the core of the heating unit 25' and will become condensed and pass or flow downwardly by gravity through said tubes to the lower tank 27', giving up heat to the tubes and fins of said core in about the manner as hereinbefore recited. The fluid or water to be heated in the boiler of course will be supplied from the lower tank 27'.

In Fig. 11 there is disclosed a heating apparatus of further modified construction including features and characteristics of the invention. The present modified disclosure is generally like the disclosure of Figs. 9 and 10, incorporating the heating unit 25', the electric motor for driving the blower or fan 39', the casing 41', the boiler, the burner 93' with its appurtenances, and the fixture plate 125' of said Figs. 9 and 10, each of which elements is generally of construction and adapted to function in the manner as hereinbefore set forth, but omitting other elements of said Figs. 9 and 10. Stated differently, the heating apparatus of Fig. 11 is adapted for employment as an entity independent of the cooling or circulating system of an internal combustion engine, and omits all of the elements of Figs. 9 and 10 which are adapted to the purpose of controlling the circulation of fluid-cooling medium from an internal combustion engine through said heating apparatus, as well as the control plunger 80'. Instead, the present heating apparatus is self-contained, or, more explicitly, is a self-contained fuel or fluid fuel or gasoline heated steam or hot vapor heating apparatus which operates in the same general manner as does the equivalent heating apparatus of Figs. 9 and 10, except that the heating apparatus of Fig. 11 includes a manually operable valve 80ª as a substitute for the control plunger 80' of said Figs. 9 and 10 for the same purpose as said control plunger. The burner 93' is put in operation by manual movement of the valve 80ª to the open position of the exhaust passageway through the fixture plate 125' and is extinguished by movement of said valve to the closed position of said exhaust passageway. As long as the burner of Fig. 11 is operating, steam or hot vapor will be fed to the heating unit 25' and when the burner is extinguished the supply of steam or hot vapor to said heating unit will be discontinued.

Subject matter common to this application and my co-pending application, Serial No. 278,704, filed June 12, 1939, is claimed in said co-pending application.

What is claimed is:

1. A combination heated fluid medium and hot vapor medium heating apparatus, comprising a heating unit including a blower adapted to be driven to cause air to be circulated in contact with said heating unit, means for diverting fluid-cooling medium from a circulating system of an internal combustion engine and for utilizing the diverted fluid-cooling medium at the heating unit as heated fluid medium for raising the temperature of said heating unit, said means including a connection for conveying fluid-cooling medium from the internal combustion engine to the heating unit and a connection for conveying fluid-cooling medium from said heating unit to said internal combustion engine, an upstanding boiler built into said heating unit and adapted to communicate therewith, a burner for heating said boiler to provide hot vapor medium for raising the temperature of said heating unit, a connection between an upper portion of said boiler and said heating unit for directing flow of hot vapor medium from the boiler to the heating unit, a connection between said heating unit and a lower portion of said boiler for directing flow of fluid medium from the heating unit to the boiler, said burner being adapted to be operative to heat said boiler to transform fluid medium therein to hot vapor medium and said hot vapor medium being adapted to travel to said heating unit and there become condensed and to return to said boiler, means for causing said burner to be operative to heat said boiler when said diverted fluid-cooling medium is at relatively lower temperatures and to be incapable of imparting heat to the boiler when the diverted fluid-cooling medium is at comparatively higher atemperatures, and means for causing said connections for conveying fluid-cooling medium from said internal combustion engine to said heating unit and from the heating unit to the internal combustion engine to be shut off when said burner is operative to heat said boiler and to be open when said burner is incapable of imparting heat to said boiler.

2. A combination heated fluid medium and hot vapor medium heating apparatus, comprising a heating unit including a blower adapted to be driven to cause air to be circulated in contact with said heating unit, means for diverting fluid-cooling medium from a circulating system of an internal combustion engine and for utilizing the diverted fluid-cooling medium at the heating unit as heated fluid medium for raising the temperature of said heating unit, said means including a connection for conveying fluid-cooling medium from the internal combustion engine to the heating unit and a connection for conveying fluid-cooling medium from said heating unit to said internal combustion engine, a plurality of control bellows including a control bellows in each of said mentioned connections and adapted to be expanded in response to increase of temperature of the fluid-cooling medium and to be contracted in response to decrease of temperature of said fluid-cooling medium, a plurality of valve means including a valve in each of said mentioned connections adapted to be actuated by each of said control bellows, a boiler adapted to contain fluid medium, a burner for heating said boiler to provide hot vapor medium for raising the temperature of said heating unit, a connection for directing flow of hot vapor medium from the boiler to the heating unit, a connection for directing flow of fluid medium from said heating unit to said boiler, said burner being adapted to be operative to heat said boiler to transform fluid medium therein to hot vapor medium and said hot vapor medium being adapted to travel to said heating unit and there become condensed and to return to said boiler, and means for causing said burner to be operative to heat said boiler when said control bellows are in relatively contracted conditions and to be incapable of imparting heat to the boiler when the control bellows are in comparatively expanded conditions, said valves being adapted to cause said connections for conveying fluid-cooling medium from said internal combustion engine to said heating unit to be open when said burner is incapable of imparting heat to said boiler and to be shut off when said burner is operative to heat said boiler.

HARRY ROSE.